United States Patent
Kim et al.

(10) Patent No.: US 10,435,065 B2
(45) Date of Patent: Oct. 8, 2019

(54) STEERING TORQUE COMPENSATION APPARATUS AND METHOD FOR ELECTRIC POWER STEERING SYSTEM

(71) Applicant: Hyundai Mobis Co., Ltd., Seoul (KR)

(72) Inventors: Tae Hong Kim, Seongnam-si (KR); Pil Woo Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 208 days.

(21) Appl. No.: 15/462,601

(22) Filed: Mar. 17, 2017

(65) Prior Publication Data

US 2017/0267279 A1 Sep. 21, 2017

(30) Foreign Application Priority Data

Mar. 21, 2016 (KR) .......................... 10-2016-0033448

(51) Int. Cl.
*B62D 6/00* (2006.01)
*B62D 5/04* (2006.01)

(52) U.S. Cl.
CPC .............. *B62D 6/00* (2013.01); *B62D 5/0463* (2013.01); *B62D 5/0481* (2013.01); *B62D 5/0496* (2013.01)

(58) Field of Classification Search
None
See application file for complete search history.

(56) References Cited

U.S. PATENT DOCUMENTS

| | | | |
|---|---|---|---|
| 8,554,418 B2 | 10/2013 | Kim | |
| 8,838,282 B1* | 9/2014 | Ratliff | H02J 13/0013 700/19 |
| 2003/0079932 A1* | 5/2003 | Ono | B62D 5/008 180/407 |
| 2006/0090954 A1* | 5/2006 | Sugitani | B62D 5/003 180/446 |
| 2011/0066330 A1* | 3/2011 | Kim | B62D 5/0463 701/42 |

FOREIGN PATENT DOCUMENTS

| | | |
|---|---|---|
| CN | 102019956 | 4/2011 |
| KR | 10-0247334 | 4/2000 |
| KR | 10-2011-0029363 | 3/2011 |

* cited by examiner

*Primary Examiner* — Christian Chace
*Assistant Examiner* — Kyung J Kim
(74) *Attorney, Agent, or Firm* — H.C. Park & Associates, PLC

(57) ABSTRACT

A torque compensation apparatus for an electric power steering system may include: a temperature sensor configured to sense the initial temperature around the electric power steering system when a vehicle is started; a motor position sensor configured to sense a motor angle of the electric power steering system; a timer configured to detect an operation time of the started vehicle; and a controller configured to calculate a compensation gain when the initial temperature corresponds to a preset low-temperature state, the compensation gain reflects the increasing ambient temperature, and is based on the motor angles accumulated during steering and the accumulative operation time detected through the timer after the start of the vehicle; and the controller outputs the compensation gain to compensate for a motor output torque of the electric power steering system.

8 Claims, 3 Drawing Sheets

STEERING TORQUE COMPENSATION APPARATUS AND METHOD FOR ELECTRIC POWER STEERING SYSTEM

CROSS-REFERENCE TO RELATED APPLICATION

This application claims priority from and the benefit of Korean Patent Application No. 10-2016-0033448, filed on Mar. 21, 2016, which is hereby incorporated by reference for all purposes as if set forth herein.

BACKGROUND

Field

Exemplary embodiments relate to a steering torque compensation apparatus and method for an electric power steering system, and more particularly, to a steering torque compensation apparatus and method for an electric power steering system, which is capable of removing a feeling of strangeness or heavy steering feeling that occurs when friction increases due to an increase in viscosity of grease or contraction of a mechanical part in a vehicle traveling at low temperature.

Discussion of the Background

In general, a hydraulic steering system using hydraulic pressure of a hydraulic pump has been used as a steering system for a vehicle. After the 1990s, however, an electric power steering system using a motor has been increasingly common.

In the existing hydraulic steering system, the hydraulic pump serving as a power source for supplying steering assist power is driven by an engine and always consumes energy regardless of whether a steering wheel is turned. In the electric power steering system, however, when a steering torque is generated by a turn of the steering wheel, the motor supplies steering assist power proportional to the generated steering torque. Therefore, the electric power steering system can improve the energy efficiency more than the hydraulic steering system.

FIG. 1 is a diagram illustrating the configuration of a conventional electric power steering system.

As illustrated in FIG. 1, the conventional electric power steering system includes a steering system 100 connecting from a steering wheel 101 to both wheels 108 and an assist power mechanism 120 for supplying steering assist power to the steering system.

The steering system 100 includes a steering shaft 102 which has an upper end connected to the steering wheel 101 and is rotated with the steering wheel 101. Furthermore, the steering shaft 102 has a lower end connected to a pinion shaft 104 through a pair of universal joints 103. The pinion shaft 104 is connected to a rack bar 109 through a rack-pinion mechanism 105, and either end of the rack bar 109 is connected to the corresponding wheel 108 of the vehicle through a tie rod 106 and a knuckle arm 107.

The rack-pinion mechanism 105 includes a pinion gear 111 and a rack gear 112 which are engaged with each other. The pinion gear 111 is formed at the lower end of the pinion shaft 104, and the rack gear 112 is formed at one side of the outer circumferential surface of the rack bar 109. The rack-pinion mechanism 105 changes a rotational motion of the pinion shaft 104 into a linear motion of the rack bar 109. Thus, when a driver operates the steering wheel 101, the pinion shaft 104 is rotated, the rack bar 109 is linearly moved in the axial direction according to the rotation of the pinion shaft 104, and the linear motion of the rack bar 109 steers the wheel 108 through the tie rod 106 and the knuckle arm 107.

The assist power mechanism 120 includes a torque sensor 121, an ECU (Electronic Control Unit) 123, a motor 130 and a transmission device 140. The torque sensor 121 senses a steering torque applied to the steering wheel 101 by the driver and outputs an electrical signal proportional to the sensed steering torque, the ECU 123 generates a control signal based on the electrical signal received from the torque sensor 121, the motor 130 generates steering assist power based on the control signal received from the ECU 123, and the transmission device 140 transmits the steering assist power generated by the motor 130 to the rack bar 109 through a gear or belt.

Thus, the above-described electric power steering system transmits a steering torque generated by a turn of the steering wheel 101 to the rack bar 109 through the rack-pinion mechanism 105, and steering auxiliary power generated by the motor 130 according to the generated steering torque is transmitted to the rack bar 109 by the transmission device 140. That is, the steering torque generated by the steering system 100 and the steering assist power generated by the motor 130 are combined to move the rack bar 109 in the axial direction.

Unlike the configuration of FIG. 1, the electric power steering system may be configured to transmit the steering auxiliary power generated by the motor 130 to the steering shaft 102 or the pinion shaft 104 through the transmission device 140.

In the electric power steering system, however, when the driver starts the vehicle which has been parked for a long time at a low temperature in the winter time, for example, and then initially operates the steering wheel, a larger steering force is required than in a normal state (that is, room temperature). Such a phenomenon may occur when parts constituting the transmission device contract at low temperature or the viscosity of lubricating oil such as grease increases.

Therefore, the electric power steering system requires a compensation unit for current control of the motor which generates power to assist a steering force depending on temperature. When temperature measured in real time through a temperature sensor is applied to a torque compensation release condition, a large current change may occur depending on a driving situation such as steering to the end or a road condition. In this case, an undesired steering force may be generated. That is, when torque is compensated for based on only the temperature information, an unexpected steering feeling or a feeling of strangeness may occur.

The above information disclosed in this Background section is only for enhancement of understanding of the background of the invention and, therefore, it may contain information that does not constitute prior art.

SUMMARY

Exemplary embodiments of the present invention provide a steering torque compensation apparatus and method for an electric power steering system, which is capable of removing a feeling of strangeness or heavy steering feeling that occurs when friction increases due to an increase in viscosity of grease or contraction of a mechanical part in a vehicle traveling at low temperature.

In one embodiment, a torque compensation apparatus for an electric power steering system may include: a temperature sensor configured to sense an initial temperature around the electric power steering system when a vehicle is started; a motor position sensor configured to sense a motor angle of the electric power steering system; a timer configured to detect an operation time of the started vehicle; and a controller configured to calculate a compensation gain when the initial temperature corresponds to a preset low-temperature state, the compensation gain reflects the increasing ambient temperature, and is based on the motor angles accumulated during steering and the accumulative operation time detected through the timer after the start of the vehicle; the controller outputs the compensation gain to compensate for a motor output torque of the electric power steering system.

The controller may store a time required for the electrical power steering system to reach a normal state from the initial temperature in the form of a lookup table LUT1 in an internal memory, the lookup table LUT1 being configured through a temperature test for each vehicle type in advance, and calculate a compensation gain attenuation factor based on the time required for reaching the normal state at each temperature in the lookup table.

The compensation gain attenuation factor may gradually increase with time, based on the time required for reaching the normal state at each temperature.

The controller may accumulate the motor angles sensed through the motor position sensor, and calculate a compensation gain corresponding to the accumulated motor angle by referring to a lookup table LUT2 which is preset based on the initial temperature sensed through the temperature sensor.

The controller may correct the compensation gain, calculated in response to the accumulated motor angle by referring to the lookup table LUT2 which is preset based on the initial temperature sensed through the temperature sensor, through a preset operation using a compensation gain attenuation factor which is calculated based on the time required for the electrical power steering system to reach the normal state from the initial temperature.

In another embodiment, a torque compensation method for an electric power steering system may include: sensing, by a controller, an initial temperature around the electric power steering system using a temperature sensor, when a vehicle is started; sensing, by a motor position sensor, a motor angle of the electric power steering system; detecting, by a timer, an operation time of the started vehicle; accumulating, by the controller, the motor angles and operation times; and calculating, by the controller, when the initial temperature corresponds to a preset low-temperature state appears, a compensation gain reflecting the increasing ambient temperature, the compensation gain is also based on the motor angles and operation times which are accumulated during steering, and outputting, by the controller, the compensation gain to compensate for a motor output torque of the electric power steering system.

In order to calculate the compensation gain, the controller may calculate a compensation gain attenuation factor, based on a time required for reaching a normal state at each temperature, which is stored in the form of a lookup table LUT1 in an internal memory, the lookup table LUT1 being configured through a temperature test for each vehicle type in advance and storing a time required for the electrical power steering system to reach the normal state from the initial temperature.

The compensation gain attenuation factor may gradually increase with time, based on the time required for reaching the normal state at each temperature.

In order to calculate the compensation gain, the controller may accumulate the motor angles sensed through the motor position sensor, and calculate a compensation gain corresponding to the accumulated motor angle by referring to a lookup table LUT2 which is preset based on the initial temperature sensed through the temperature sensor.

In order to calculate the compensation gain, the controller may correct the compensation gain, calculated in response to the accumulated motor angle by referring to the lookup table LUT2 which is preset based on the initial temperature sensed through the temperature sensor, through a preset operation using a compensation gain attenuation factor which is calculated based on the time required for the electrical power steering system to reach the normal state from the initial temperature.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
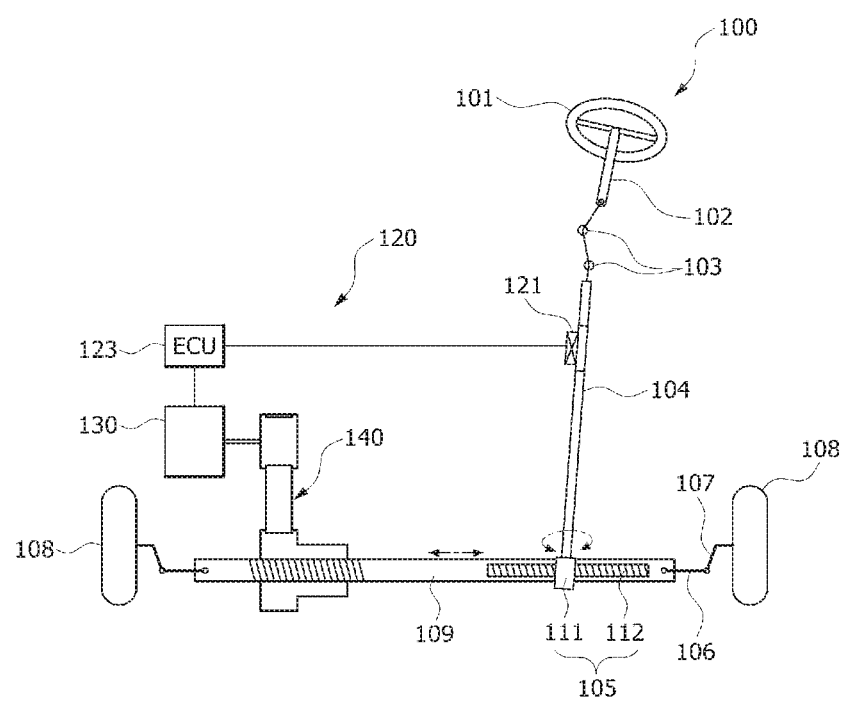
FIG. 1 is a diagram illustrating the configuration of a conventional electric power steering system.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 2:
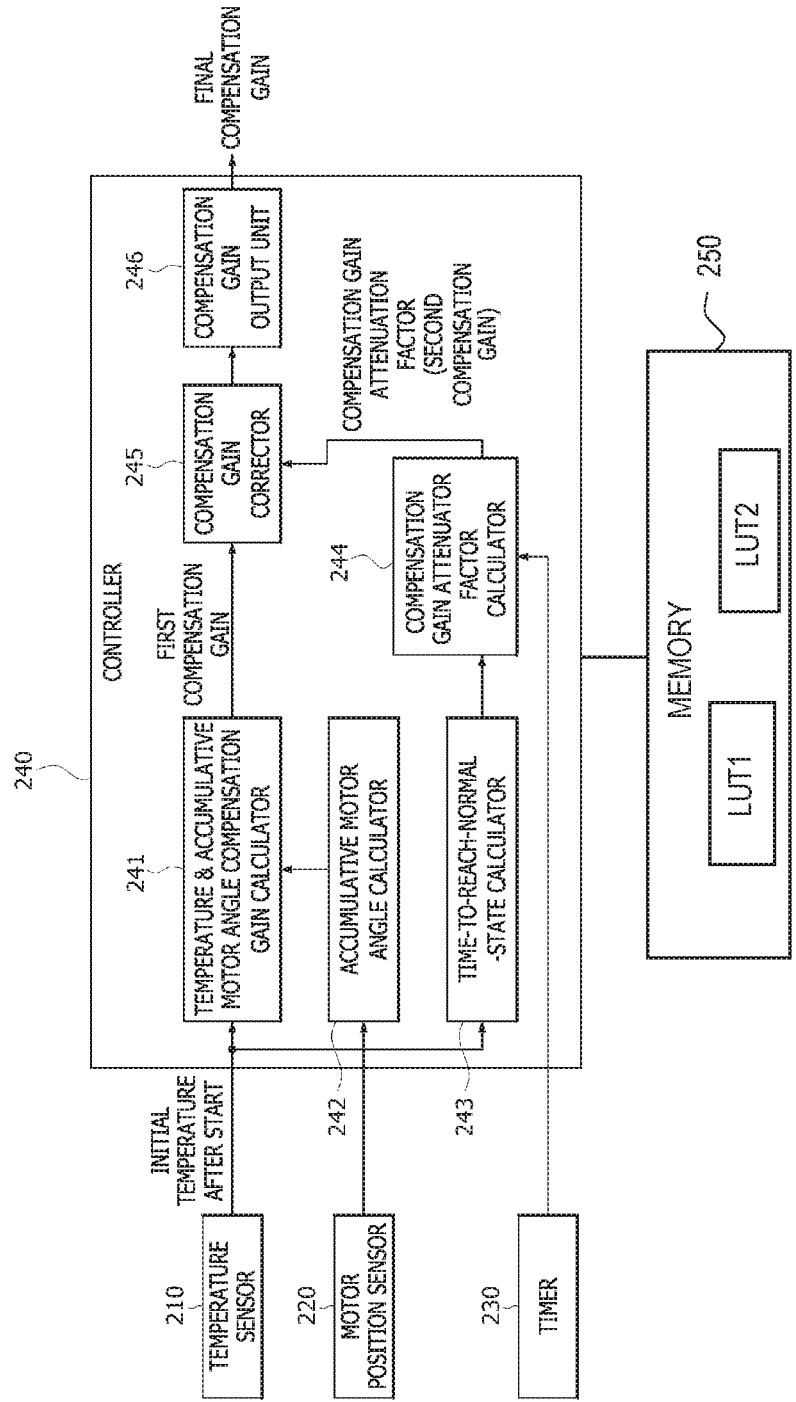
FIG. 2 is a diagram illustrating a schematic configuration of a torque compensation apparatus for an electric power steering system in accordance with an exemplary embodiment.

FIG. 2 is a diagram illustrating a schematic configuration of a torque compensation apparatus for an electric power steering system in accordance with an exemplary embodiment.

As illustrated in FIG. 2, the torque compensation apparatus for an electric power steering system in accordance with the present exemplary embodiment may include a temperature sensor 210, a motor position sensor 220, a timer 230, and a controller 240. The controller 240 may include a temperature & accumulative motor angle compensation gain calculator 241, an accumulative motor angle calculator 242, a time-to-reach-normal-state calculator 243, a compensation gain attenuation factor calculator 244, a compensation gain corrector 245, and a compensation gain output unit 246.

When the vehicle is started, the temperature sensor 210 may sense the ambient temperature of the electric power steering system. The temperature sensed after the vehicle is started may be set as the initial temperature.

The time-to-reach-normal-state calculator 243 may calculate a time required for reaching a preset normal state from the sensed initial temperature. The normal state may indicate a normal state in which an operation of the electric power steering system is preset.

The time required for reaching the normal state may be stored in the form of a lookup table LUT1 in an internal memory 250, the lookup table LUT1 being configured by performing a temperature test for each vehicle type in advance.

The lookup table LUT1 may include the time required for reaching the normal state depending on the initial temperature, which is obtained through a test considering the viscosity of grease decreases or the contraction of mechanical parts returns to a normal state, due to heat transmitted from an engine or the like with operation time after the vehicle is started. Based on the lookup table LUT1, a compensation gain attenuation factor depending on the operation time may be calculated and multiplied by a compensation gain calculated from the initial temperature, in order to acquire the final compensation gain.

The calculated time required for reaching the normal state at each temperature may be transmitted to the compensation gain attenuation factor calculator 244.

The compensation gain attenuation factor calculator 244 may calculate a compensation gain attenuation factor based on the time required for reaching the normal state at each temperature, which is received from the time-to-reach-normal-state calculator 243. For example, when the time required for reaching the normal state at each temperature is set to five minutes, the compensation gain attenuation factor calculator 244 process the compensation gain attenuation factor to gradually increase over time for a period of five minutes.

The timer 230 checks the time which has elapsed after the vehicle was started.

The timer 230 may output the checked time information to the compensation gain attenuation factor calculator 244. At this time, the compensation gain attenuation factor outputted from the compensation gain attenuation factor calculator 244 may be expressed as a percentage (%) value, but referred to as a second compensation gain, for convenience of description. In this case, a compensation gain outputted from the temperature & accumulative motor angle compensation gain calculator 241 may be referred to as a first compensation gain.

The motor position sensor 220 may sense a motion of a motor (not illustrated) of the electric power steering system. The motion of the motor, sensed through the motor position sensor 220, may be accumulated through the accumulative motor angle calculator 242.

When the number of motor angles accumulated in the accumulative motor angle calculator 242 increases, it may indicate that the steering wheel has been frequently operated and the temperature rises more rapidly than when the steering wheel is not operated.

The accumulative motor angle calculator 242 may output the accumulated motor angle information to the temperature & accumulative motor angle compensation gain calculator 241.

The temperature & accumulative motor angle compensation gain calculator 241 may calculate a compensation gain corresponding to the accumulated motor angle by referring to a preset lookup table LUT2, based on the initial temperature sensed through the temperature sensor 210.

The lookup table LUT2 may include a compensation gain suitable for each situation, which is obtained through a test based on the initial temperature and an accumulated steering angle (that is, accumulated motor angle) required for reaching the normal state of the electric power steering system, after the vehicle was started.

Instead of using the lookup tables LUT1 and LUT2 for the time-to-reach-normal-state calculator 243 and the temperature & accumulative motor angle compensation gain calculator 241, respectively, the time required for reaching the normal state at each temperature or the compensation gain can be calculated through a preset equation.

The compensation gain corrector 245 may perform an operation (for example, multiplication or addition) on the compensation gain (or first compensation gain) outputted from the temperature & accumulative motor angle compensation gain calculator 241 and the compensation gain attenuation factor (or second compensation gain) outputted from the compensation gain attenuation factor calculator 244, and output a compensation gain corrected by the two values (for example, the compensation gain and the compensation gain attenuation factor).

The compensation gain output unit 246 may apply the compensation gain outputted from the compensation gain corrector 245 to output logic (e.g., an algorithm) corresponding to the motor of the electric power steering system applied to the vehicle, and thus output the final compensation gain. The final compensation gain may be used to compensate for the output torque of the motor (not illustrated).

As described above, the torque compensation apparatus in accordance with the present exemplary embodiment may determine the initial temperature around the electric power steering system, sensed through the temperature sensor 210 after the vehicle has been started, calculate a compensation gain at each temperature, detected in a low temperature state (when the temperature is equal to or less than a preset temperature), and compensate for an output torque. In the present exemplary embodiment, the torque compensation apparatus can calculate the compensation gain by using the increasing ambient temperature, considering the motor angles accumulated during steering, and considering the accumulative time of vehicle operation (that is, accumulative time detected through the timer after the vehicle was started), and thus improve the accuracy and the stability of torque compensation. This exemplary torque compensation may be different from the existing configuration for canceling torque compensation or calculating a compensation gain based on temperature measured in real time (for example, based on a temperature which rapidly changes due to a current amount which is changed depending on steering to the end or road condition).

Figure 3:
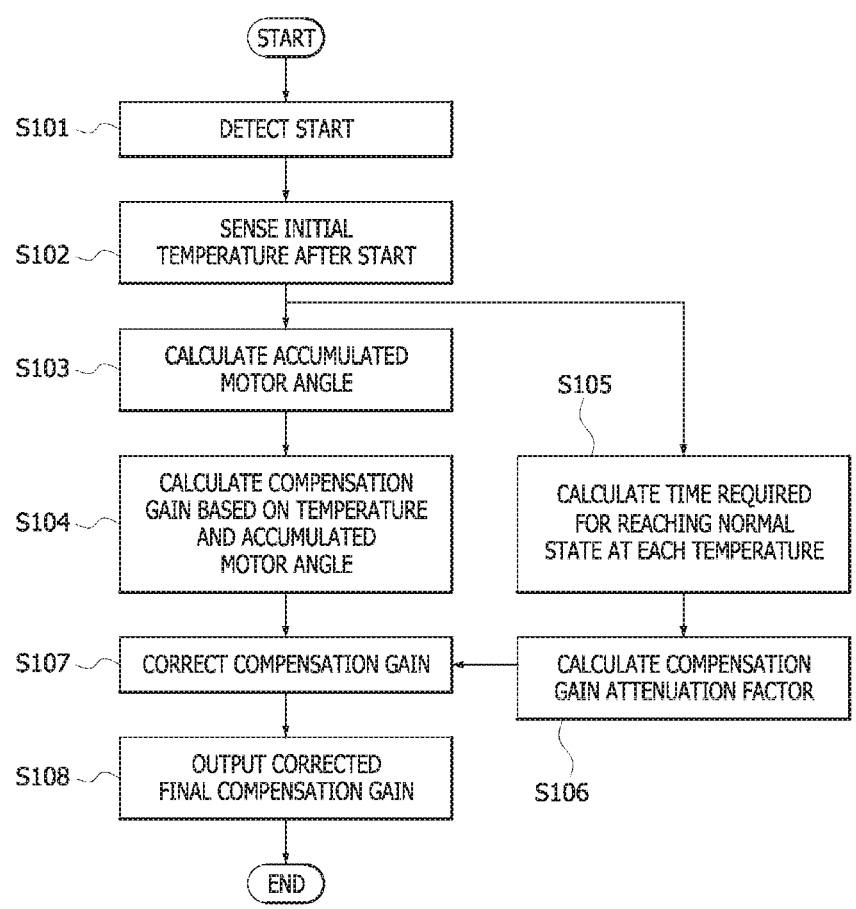
FIG. 3 is a flowchart for describing a torque compensation method for an electric power steering system in accordance with an exemplary embodiment.

FIG. 3 is a flowchart for describing a torque compensation method for an electric power steering system in accordance with an exemplary embodiment.

As illustrated in FIG. 3, when a start of the vehicle is detected at step S101, the controller 240 detects the initial temperature around the electric power steering system through the temperature sensor 210 at step S102.

The controller 240 calculates a time required for reaching a preset normal state at each temperature from the detected initial temperature at step S105. The normal state may indicate a normal state in which an operation of the electric power steering system is preset.

The time required for reaching the normal state may be stored in the form of a lookup table LUT1 in an internal memory 250, the lookup table LUT1 being configured by performing a temperature test for each vehicle type in advance.

The controller 240 may calculate a compensation gain attenuation factor based on the time required for reaching the normal state at each temperature at step S106.

For example, when the required for reaching the normal state at each temperature is set to five minutes, the controller 240 may process a compensation gain attenuation factor to gradually increase with time for five minutes.

The controller 240 may detect a motion of the motor through the motor position sensor 220 and calculate an accumulated motor angle, at step S103.

At this time, when the number of accumulated motor angles increases, it may indicate that the steering wheel has been frequently operated and the temperature rises more rapidly than when the steering wheel is not operated.

The controller 240 may calculate a compensation gain corresponding to the accumulated motor angle by referring to the preset lookup table LUT2, based on the initial temperature sensed through the temperature sensor 210, at step S104.

At this time, the controller 240 may calculate the time required for reaching the normal state at each temperature or the compensation gain, using a preset separate equation in place of the lookup tables.

The controller 240 may perform an operation (multiplication or addition) on the calculated compensation gain (or first compensation gain) and the compensation gain attenuation factor (or second compensation gain), and correct the compensation gain based on the two values (for example, compensation gain and compensation gain attenuation factor), at step S107.

The controller 240 may output the final compensation gain to correct the output torque of the motor (not illustrated) using the corrected compensation gain, at step S108.

In accordance with the present embodiments, the torque compensation apparatus and method for an electric power steering system can remove a feeling of strangeness or heavy steering feeling that occurs when friction increases due to an increase in viscosity of grease or contraction of a mechanical part in a vehicle traveling at low temperature.

In exemplary embodiments, the following components ("the controller 240 and components thereof"): the controller 240, a temperature & accumulative motor angle compensation gain calculator 241, an accumulative motor angle calculator 242, a time-to-reach-normal-state calculator 243, a compensation gain attenuation factor calculator 244, a compensation gain corrector 245 and a compensation gain output unit 246, may be implemented via one or more general purpose or special purpose components, such as one or more discrete circuits, digital signal processing chips, integrated circuits, application specific integrated circuits, microprocessors, processors, programmable arrays, field programmable arrays, instruction set processors, and/or the like.

According to one or more exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, the controller 240 and components thereof may include or otherwise be associated with one or more memories (e.g., 250) including code (e.g., instructions) configured to cause the controller 240 and components thereof to perform one or more of the features, functions, processes, etc., including but not limited to the steps shown in FIG. 3.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CD-RW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A torque compensation apparatus for an electric power steering system, comprising:
   a temperature sensor configured to sense an initial temperature around the electric power steering system when a vehicle is started;
   a motor position sensor configured to sense a motor angle of the electric power steering system accumulated during steering;
   a timer configured to detect an operation time after the start of the vehicle;
   a controller configured to calculate a compensation gain when the initial temperature corresponds to a preset low-temperature state, and output the compensation gain, wherein the compensation gain is calculated based on the accumulated motor angle and the operation time to reflect an increasing ambient temperature;
   wherein the controller stores a time required for the electrical power steering system to reach a normal state from the initial temperature in a first lookup table in an internal memory, wherein the first lookup table is configured through a temperature test for each vehicle type in advance, and
   calculates a compensation gain attenuation factor based on the time required for the electrical power steering system to reach the normal state at each temperature in the first lookup table.

2. The torque compensation apparatus of claim 1, wherein the compensation gain attenuation factor gradually increases with time, based on a time required for reaching the normal state at each temperature.

3. The torque compensation apparatus of claim 1, wherein the controller accumulates the motor angle, and calculates the compensation gain corresponding to the motor angle by referring to a second lookup table which is preset based on the initial temperature sensed through the temperature sensor.

4. The torque compensation apparatus of claim 1, wherein the controller corrects the compensation gain, wherein the compensation gain is calculated in response to the accumulated motor angle by referring to another second lookup table which is preset based on the initial temperature sensed through the temperature sensor, through a preset operation using another compensation gain attenuation factor which is calculated based on a time required for the electrical power steering system to reach a normal state from the initial temperature.

5. A torque compensation method for an electric power steering system, comprising:
   sensing, by a controller, an initial temperature around the electric power steering system using a temperature sensor, when a vehicle is started;
   sensing, by a motor position sensor, a motor angle of the electric power steering system during steering;
   detecting, by a timer, an operation time after the start of the vehicle;
   accumulating, by the controller, the motor angle and the operation time;
   calculating, by the controller, a compensation gain when the initial temperature corresponds to a preset low-temperature state, wherein the compensation gain reflects an increasing ambient temperature, based on the motor angle and operation time; and
   outputting, by the controller, the compensation gain to compensate for a motor output torque of the electric power steering system;
   wherein the calculating step is accomplished by calculating a compensation gain attenuation factor, based on a time required for reaching a normal state at each temperature, which is stored in a first lookup table in an internal memory, wherein the first lookup table is configured through a temperature test for each vehicle type in advance and stores a time required for the electrical power steering system to reach the normal state from the initial temperature.

6. The torque compensation method of claim 5, wherein the compensation gain attenuation factor gradually increases with time, based on the time required for reaching the normal state at each temperature.

7. The torque compensation method of claim 5, wherein the calculating step is accomplished by accumulating, by the controller, the motor angle, and calculating, by the controller, the compensation gain corresponding to the motor angle by referring to a second lookup table which is preset based on the initial temperature sensed through the temperature sensor.

8. A torque compensation method for an electric power steering system, comprising:
   sensing, by a controller, an initial temperature around the electric power steering system using a temperature sensor, when a vehicle is started;
   sensing, by a motor position sensor, a motor angle of the electric power steering system during steering;
   detecting, by a timer, an operation time after the start of the vehicle;
   accumulating, by the controller, the motor angle and the operation time;
   calculating, by the controller, a compensation gain when the initial temperature corresponds to a preset low-temperature state, wherein the compensation gain reflects an increasing ambient temperature, based on the motor angle and operation time; and
   outputting, by the controller, the compensation gain to compensate for a motor output torque of the electric power steering system, and
   further comprising correcting the compensation gain, by using the controller to calculate the compensation gain in response to the motor angle by referring to a lookup table which is preset based on the initial temperature sensed through the temperature sensor, through a preset operation using a compensation gain attenuation factor which is calculated based on a time required for the electrical power steering system to reach a normal state from the initial temperature.

* * * * *